US008700414B2

(12) United States Patent  (10) Patent No.: US 8,700,414 B2
Rothermel et al.  (45) Date of Patent: Apr. 15, 2014

(54) SYSTEM SUPPORTED OPTIMIZATION OF EVENT RESOLUTION

(75) Inventors: Gunther Rothermel, Rauenberg/Malschenberg (DE); Dirk Wodtke, Aptos, CA (US)

(73) Assignee: SAP AG, Walldorf (DE)

( * ) Notice: Subject to any disclaimer, the term of this patent is extended or adjusted under 35 U.S.C. 154(b) by 2156 days.

(21) Appl. No.: 11/027,578

(22) Filed: Dec. 29, 2004

(65) Prior Publication Data

US 2006/0143034 A1   Jun. 29, 2006

(51) Int. Cl.
*G06Q 10/00*   (2012.01)

(52) U.S. Cl.
USPC ........... 705/1.1; 705/7.26; 705/7.27; 707/608

(58) Field of Classification Search
USPC ....................................... 705/1, 1.1
See application file for complete search history.

(56) References Cited

U.S. PATENT DOCUMENTS

| | | | |
|---|---|---|---|
| 5,999,911 A | 12/1999 | Berg et al. | |
| 2004/0111302 A1* | 6/2004 | Falk et al. | 705/4 |
| 2004/0186762 A1* | 9/2004 | Beaven et al. | 705/8 |
| 2004/0260593 A1 | 12/2004 | Abraham-Fuchs et al. | |

FOREIGN PATENT DOCUMENTS

| | | |
|---|---|---|
| WO | WO 0159626 A | 8/2001 |
| WO | WO 2004/102454 A | 11/2004 |

* cited by examiner

*Primary Examiner* — Jami A Plucinski
*Assistant Examiner* — Fathi Abdelsalam
(74) *Attorney, Agent, or Firm* — Fountainhead Law Group PC

(57) ABSTRACT

A system being monitored generates alerts directed at participants as events to be resolved occur. As a participant resolves an alerted event, the system logs the steps taken by the participant to resolve the event and stores the event resolution log associated with the event. From that event resolution log, a template for a workflow process can be automatically generated. When similar events occur again, the participant for those future events can be provided with the prior stored event resolution log and/or automatically generated templates for a workflow processes corresponding to the stored event resolution log. Iterative generation and editing of templates can be provided for, wherein subsequent event resolutions for similar events are used to modify the workflow process templates developed from previous event resolutions. Events can include conditions being met in data stored by the system or events representing the lack of occurrence of expected events. Participants can be human users, automated participants or proxies interfacing human users to the system. In one embodiment, the system is a network connecting business collaborators.

20 Claims, 8 Drawing Sheets

Manage Interaction Templates

You can execute or delete existing common or personal interaction, or you can create new templates Common Interaction Templates

[Create] [Execute]

| Description | Created By: | Created On: | Remove |
|---|---|---|---|
| ☐ Revamp Sales Activity | | | |
| ☐ Perform Market Analysis | | | |
| ☐ Perform Niche Analysis | | | |
| ☐ Reshape Sales Organization | | | |

Personal Interaction Templates

[Create] [Execute]

| Description | Created By: | Created On: | Remove |
|---|---|---|---|
| ☐ Revamp Sales Activity | | | |
| ☐ Perform Market Analysis | | | |
| ☐ Perform Niche Analysis | | | |
| ☐ Reshape Sales Organization | | | |

FIG. 10

SYSTEM SUPPORTED OPTIMIZATION OF EVENT RESOLUTION

BACKGROUND OF THE INVENTION

Increasingly, organizations that use large amounts of data to support their operations need tools to work with that data to support efficient operations. An example of this is data warehousing, wherein an organization compiles all of its business data such as transaction information into a centralized data warehouse that can be queried for analysis and reporting using systems such as online analysis processing (OLAP) systems, data mining, forecasting and simulation. In a typical process, an organization will assign analysts to "slice and dice" the business data in order to discover trends and potential for improvement of business processes and such analysis is followed by planning wherein business processes are devised and then put into execution.

With such systems available to the organization, many organizations find that they can use the available information in execution rather than just for improving business processes. As an example, an analyst might determine, based on the business data, that profit margins are lower for selling product to a particular geographical region and the organization might respond by implementing a business process wherein prices are increased for selected geographical regions or sales efforts in less profitable geographical regions are reduced. That is an example of business processes being developed based on analysis of the business data.

Use of the information in execution need not involve changes to the business process. For example, a shipping manager might use business data in determining where orders are being delayed and respond by finding bottlenecks in shipping and getting product out faster. In this latter use of business data, a system might monitor the business data (and possibly also the state of various other systems within the organization) and when certain events occur, issue alerts to particular participants.

Workflow Systems

Computerized workflow systems allow for collaboration that can be organized, structured and repeated, all of which supports accountability and efficiency. Of course, even with a single actor, workflow systems have benefits in the organization and structure of work. In some workflow systems, workflow is structured into instances and in a large structured workflow system, thousands of workflow instances might be processed daily.

A workflow item is a unit of a workflow system. A workflow item might represent a task that involves interaction among participants. Examples of tasks might be a team leader assigning an operation to a team member, doing the operation (performed by the team member assigned to the operation), reviewing the results of the operation (performed by a reviewer who might be the team leader, the team member or another person), signing off on the completion of the operation, tracking the task, etc.

A workflow process is a collection of tasks and links between them, where a link might provide order dependencies among tasks, rules and/or data to link tasks. For example, the tasks listed above might be part of a process wherein the team leader assigns tasks, which triggers the start of the doing of the operation, the completion of which triggers the need for review, which must occur before the signing off, while tracking can be done between the assignment and the signing off (or some other rule might apply). One workflow process might be reused many times for unrelated operations. Operations themselves might be performed using workflow processes, typically depending on complexity.

A workflow system provides each participant with an interface where actions to be done might be presented, prioritized and tracked. A workflow system might be organized in a client-server structure, with the server maintaining process templates, instances of ongoing processes, workflow items for each user and logic to present a user with his or her workflow items, via a client system. SAP's NetWeaver™ system provides an example of a workflow system.

Structured workflow has advantages of being trackable and testable. Structured workflow is trackable in that an analyst can later determine how a process proceeded and can identify other performance data and data underlying the work being done. In a typical arrangement, users have access to structured systems, such as a workflow management system and communication systems such as e-mail systems, instant messaging systems, and the like.

Event Alerts

An event resolution system might regularly issue alerts to participants based on configurable business events. The alert recipient in many cases improvises when reacting to an alert, i.e., performs actions he or she feels are appropriate. As a consequence, the quality of the event resolution depends on the intuition and experience of the alert recipient. For similar events, potentially different strategies for resolution might be taken.

As specified by the event resolution system, a participant to which an alert is to be directed can be specified as a particular individual, a particular role (e.g., the sales department manager for the Southwest Region, whoever that happens to be), a computer process that stands in as an alert recipient, or a group of one or more of the above. An alert rule base can be used to specify which events merit alerts so that participants are not swamped with alerts to the point of ignoring them, but instead receive relevant alerts such that the recipient participants can resolve or participate in the resolution of the events that generated the alerts.

An example of an alert rule is that a sales rep's supervisor is to be alerted when the delivery date for an order for that sales rep that exceeds some threshold size is delayed from its scheduled ship date by more than a threshold amount of time. It should be apparent that an event resolution system that has access to an online transaction processing (OLTP) system, an order processing system and data relating to the organization's org chart can determine delivery dates for orders, determine the sales rep for orders, determine the supervisor of the sales rep, the size of orders, the current date and an indication of how to get a message to the supervisor. Thus, an event resolution system that includes an event monitor to flag for selected events maintains a set of alert filters that specify when a participant is to be alerted about the occurrence of an event (or the lack of occurrence of an event that should have occurred).

Since alerts are filtered from events, in a well-organized system, most are nearly all of the alerts represent events that require resolution by the recipients of the alerts. In a typical response, the participant may resolve the event using the participant's knowledge and business experience and do so in an unstructured manner. For example, in the above example of an alert, the supervisor might place a call to a shipping department to check on status of the orders, place a call to the sales rep to check whether the customer has inquired about the delay, look up customer records, diagnose other possible reasons for the delay and then take some action to either resolve the delay or work with the customer to accommodate a delayed shipment. Unfortunately, when events are resolved in an unstructured manner, other participants within the organization might not be able to benefit from the first participant's knowledge and experience and the outcome of that first participant's resolution of the event.

Thus, what is needed is an approach to event resolution that takes advantage of structured workflow. Workflow processes might be generated in a business cycle that involves analysis of process data, review and planning of new business processes and then rolling out new business processes. However such an approach is often not useful given the wide range of events that business participants might have to deal with, the cost of implementing processes and the time lag between events occurring and rolling out new processes.

BRIEF SUMMARY OF THE INVENTION

In embodiments of business activity monitoring systems according to the present invention, a system being monitored generates alerts directed at participants as events to be resolved occur. As a participant resolves an alerted event, the system logs the steps taken by the participant to resolve the event and stores the event resolution log associated with the event. From that event resolution log, a template for a workflow process can be automatically generated. When similar events occur again, the participant for those future events can be provided with the prior stored event resolution log and/or automatically generated templates for a workflow processes corresponding to the stored event resolution log. In some embodiments, iterative generation and editing of templates is provided for, wherein subsequent event resolutions for similar events are used to modify the workflow process templates developed from previous event resolutions.

Events can include conditions being met in data stored by the system or events representing the lack of occurrence of expected events. Participants can be human users, automated participants or proxies interfacing human users to the system. One such system is SAP's NetWeaver™ comprehensive integration and application platform, usable to flexibly and rapidly design, build, implement, and execute new business strategies and processes. Other business suites might be used.

A further understanding of the nature and the advantages of the inventions disclosed herein may be realized by reference of the remaining portions of the specification and the attached drawings.

BRIEF DESCRIPTION OF THE DRAWINGS

The included figures describe aspects of the present invention.

FIG. 10 is a screenshot of a user interface for managing interaction templates.

DETAILED DESCRIPTION OF THE INVENTION

Workflow

Figure 1:
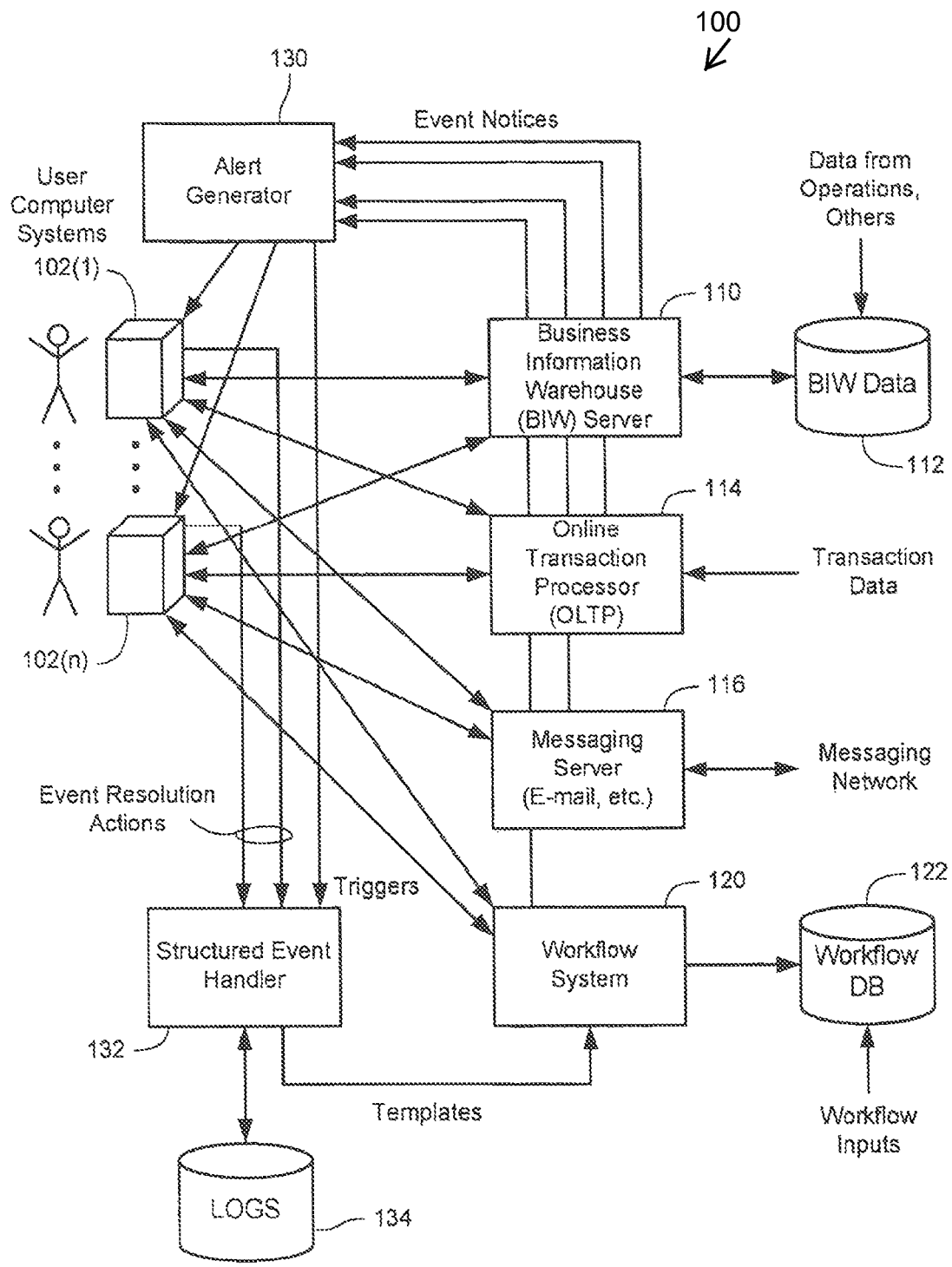
FIG. 1 is a block diagram of portions of a business management system providing tools for users to retrieve data and interact with the business management system for handling business operations and other tasks.

In a structured workflow system, a project is defined by a set of processes, each of which might have multiple steps, tasks, triggers and/or actions (work items). A workflow engine provides mechanisms for executing and scheduling the work items in a defined way. Workflow processes can be simple or complex. A simple workflow process is "Assign task A to member M, and after the assignment, M performs the task." A more complex workflow process might be "Execute task B after task A, but only if the value of X is greater than Y or member M is not in a state of 'on vacation'. In all other cases, execute task C immediately after task A. Task D follows the completion of tasks A, B and C."

The workflow engine handles imposing and executing control flow dependencies between tasks according to process workflows. Process workflows can be set up by an administrator, set up by an end user, or set up by an administrator with end user permissions to modify the process. Tasks are used in a broad variety of end user scenarios. The life cycle of a task might be jointly defined by the task creator and process participants (if task assignees are allowed to deviate from the task behavior defined by the creator). Tasks can be atomic (single step), multi-step and/or nested (i.e., represent processes themselves comprising atomic tasks or nested tasks).

Users might interact with one or more workflow clients, such as the Universal Worklist ("UWL"), described in more detail in U.S. Pat. No. 7,979,296 [U.S. patent application Ser. No. 10/841,241, filed May 7, 2004 and entitled "Universal Worklist Service and User Interface"], which is incorporated by reference herein for all purposes. The workflow clients might interact with a workflow service API layer of a workflow server, which interacts with a core layer that in turn interacts with workflow objects, data and other structures.

The workflow engine might include a template generator for creating new versions of a process definition when an end user modifies the process definition to accommodate local conditions. After the creation of a new template version, the run-time information of the process instance is merged into the new process definition. Thus, the next activity in the process instance already adheres to the new version of the process definition.

Workflow might include simple rules, such as rules for delegation, substitution, escalation, scheduling per step, etc. and more complex operations such as parallelization, use of alternatives, conditional operations, etc. System administrators might provide templates that can be used to make process instances, including, for example, steps to take, notifications to make, and other work items. With tasks tracked as workflow rather than as e-mails, auditing and tracking tasks is simplified.

Work items can represent manual steps (similar to knowledge management tasks) or computerized steps where the work item owners are supposed to enter data in application screens and to hit application buttons. A workflow work item represents a piece of work assigned to one user or a set of users by a workflow system. Work items unambiguously belong to workflow instances (instantiated workflow definitions) and keep references to the definition of the work. Work items are often accessible to end users through devices such as a UWL that allows for searching, filtering and manipulation operations such as forward, reject, execute, resubmit, etc.

In addition to executing manually work items, users can set up rules that automate the processing of work items that are transformed from messages, as with other workflow items. These rules can refer to a variety of data sources, such as work item attributes (e.g., creation date, work item type, creator of the work item, etc.), an associated business object and its attributes (e.g., document, length of a document, purchase order, amount of a purchase order, etc.), and context of the belonging workflow instance (preceding step in the process, due date of the process, etc.). This additional information about workflow items can be auto-generated, manually entered or combination thereof.

Because work items are trackable within the workflow system, auditing, tracking, prioritizing and the like are possible and make work easier to manage. When processes are predefined based on business analysis and planning, workflow processes can be developed in advance and rolled out to users. However, there are often situations that are not anticipated in advance and need to be dealt with outside of existing workflow processes. In prior systems, users might instead respond to such situations by handling the necessary resolutions outside of the workflow system and that may deny the organization the benefits of having a workflow system. Therefore, it would be desirable to be able to capture the process of resolution while events are being resolved so that the workflow system can support that resolution and future resolutions of a similar nature.

Alerts and Event Resolution

An alert is some signal to a user (participant) that a business event occurred. Examples of business events include that transaction began or concluded, that some message was sent, that some data met some criterion, or possibly a combination of different events. For example, a useful business alert would be one that signals a department manager when quarterly sales are down more than some percentage. The alert might be described formulaically, such as "if sales (this quarter, this year)/sales (this quarter, last year)<=0.75 AND date (end of this quarter), then send alert to manager M", or it might be less formulaic but nonetheless form a configurable business event.

As an example of a business system that issues alerts, SAP's Business Information Warehouse system regularly issues alerts to end users based on configurable business events. Depending on the alert and the event details for the event that generated the alert, the alert recipient may improvise by performing actions he or she feels are appropriate for resolution, such as querying data sources to obtain more information relevant to the event, communicating instructions to others, adding/deleting/modifying data, invoking transactional systems, or other tasks that can be noticed by a business activity monitoring system.

After having received an alert and before starting to resolve an alert, the alert recipient switches on the recording of his or her system interaction so that an event resolution log can be generated. This way, the event resolution log tracks actions of the alert recipient and of other people involved. At the end of the event resolution, this event resolution log is stored in persistent memory. The next time a similar alert occurs, the event resolution system suggests to the later alert recipient to analyze the log and to load the log as an "interaction template" into an end user oriented workflow engine that will guide the user through the event resolution based on the steps defined in the interaction template, which is in turn derived from the actions taken in a past resolution.

The alerts that are received can have an associated category and interaction templates might also be grouped by category. When logging the user interaction for a given alert, the system stores that interaction as being associated with that alert's category. That way, when an alert is received, the interaction templates in the same category as the alert might be shown to the resolver of the alert for selection of an appropriate template. When a later alert is received, when the system can suggest templates by retrieving templates associated with a category that matches the category of the received alert.

When a user defines a step during alert resolution, the user specifies an assignment of the step as part of the template. The possible assignments might include "self", "other person" or "role". For steps that are assigned to "self", the assignee for future alerts is the person that is resolving the alert (which may be different than the "self" that was the person resolving the earlier alert from which the template was generated). Thus, if the step is assigned to "self", the next time the template is run, this step is assigned to the person who resolves the alert.

Other assignments include "other person" wherein the step is assigned to a specific user, such as "step assigned to user=John", and "role". For a "role" assignment, the actual assignee is linked with a placeholder. For example, instead of it being assigned to John, it might be assigned to "sales_manager". Thus, if the alert occurs and includes metadata such as "alert_creation_date=2004/10/01", "threshold=20%", "sales_mgr=Mary", then the alert would be "assigned to user-Mary" in that instance.

For the subsequent resolution, the future alert recipient and other people involved can deviate from the interaction template by skipping steps, adding steps, modifying steps, or deleting steps. Again, deviations from the template are stored in a log and can be loaded as an interaction template into a workflow engine. After a sufficient number of cycles of alert resolutions, the interaction templates for an alert category will converge.

Whenever a user deviates from a template, a new template can be created (or the prior one modified, under certain conditions). Initially, it is highly likely that a template that fully met the user's requirements would not yet exist, so deviating templates will be created. After a number of such templates are created, the probability that one of them will be suitable increases, reducing the probability that new templates will be created.

Mechanisms can be used to weight the templates based on use and even deleting templates automatically if enough templates are available and some get very little use. By making interaction templates accessible system-wide, they form a best practice resolution. Thus, for an alert of a particular category, users would be able to identify best approaches for handling the alert according to templates in the particular category.

The more often an interaction template is used, the more likely it becomes that this template is offered to an alert recipient as the best known event resolution strategy. As a result the overall quality of the event resolution increases and individual experience and intuition of alert recipients only contribute to quality improvements and do not put the event resolution at risk.

Referring now to the figures, examples of apparatus and methods using aspects of the present invention are shown.

FIG. 1 is a block diagram of portions of a business management system 100 providing tools for users to retrieve data and interact with the business management system for handling business operations and other tasks. Various tools might be in place, but in this one example, user computer systems 102 have access to a business information warehouse (BW) server 110 that provides business data as might be stored in a data warehouse 112, an online transaction processor (OLTP) 114, a messaging server 116, and a workflow system 120 that operates with a workflow database 122 (among possibly other data sources and inputs).

Messaging server 116 might handle e-mail messaging, instant messaging, paging, text messaging, portal messaging and/or other forms of messaging and might handle only one type of messaging or multiple types of messaging. Alternatively, multiple messaging servers might be provided for multiple types of messaging.

Each of the various systems might be configured to emit event notices for business events of interest, with the particular events possibly determined from within each system and/or from a set of event rules external to the systems. These event notices are provided to an alert generator 130 which generates alerts for some (or all) of the events depending on alert filters. The alerts are provided to user computer systems 102 according to which users need to be alerted and which users are using which user computer system 102. In some configurations, alert generator 130 uses one or more messaging server to send the alerts.

Alert generator 130 might also signal a structured event handler 132 with a trigger for some or all of the alerts, which might begin logs for event resolution corresponding to the event notices that triggered the alerts. Alternatively, structured event handler 132 might be triggered by one of the user computer systems 102 when a user indicates the start of an event resolution.

With the number of connections between user computer systems (one for each participant using the system from a distinct user computer system), and the various systems with which they connect, it can be difficult to ensure that each system has the necessary information and each user computer system is configured properly. One simplifying approach is to use a portal server to bring all of the interaction of the user with various systems into one place.

Figure 2:
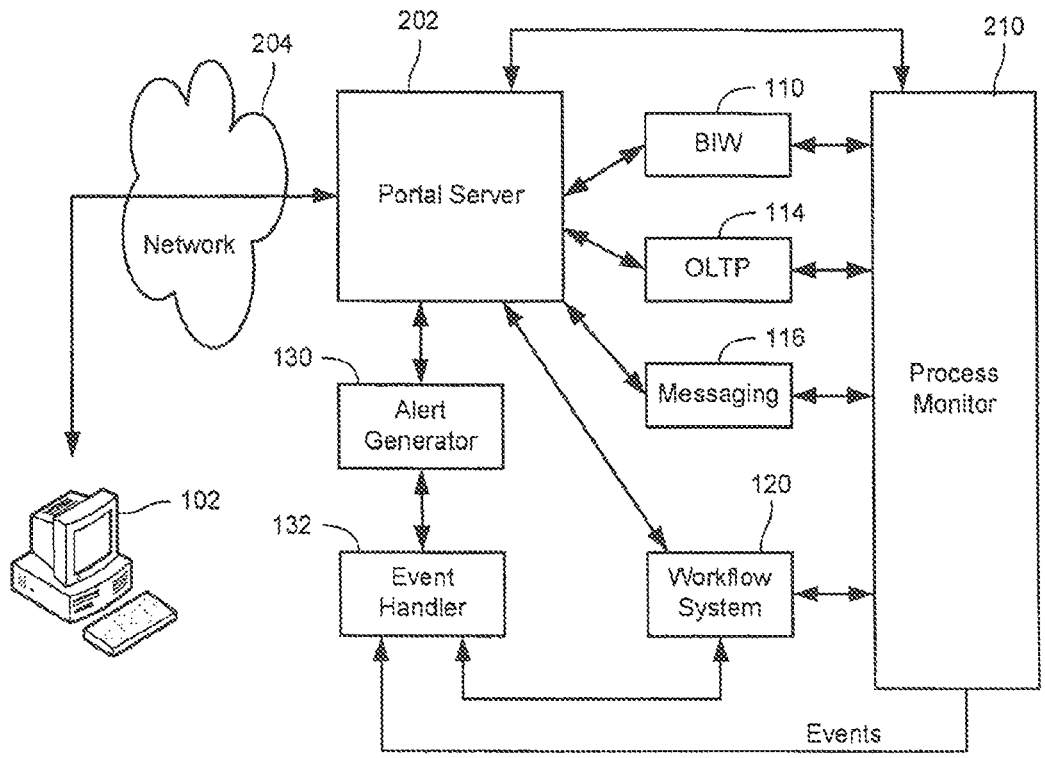
FIG. 2 is a block diagram of an alternate configuration, wherein users interact with the various business management components via a portal server.

FIG. 2 is a block diagram of an alternate configuration, wherein users interact with the various business management components via a portal server 202. As shown there, a user computer system 102 interfaces with portal server 202. It should be understood that a typical system would have many user computer systems (not shown) and possibly also other user computing devices and interfaces all connected directly or through a network 204 to portal server 202.

Portal server 202 provides an interface to the various business and other systems and each of those systems (and portal server 202) can interface to a process monitor 210. As a system deems necessary to issue an event notice, it provides it to process monitor 210. As explained below with reference to FIG. 4, process monitor 210 can also query various systems to obtain notice of events of interest to process monitor 210. In either case, process monitor 210 provides event data to structured event handler 132, which provides event notices to alert generator 130. In some embodiments, process monitor 210, structured event handler 132 and alert generator 130 are separate processes or systems and in other embodiments, two or all of them might be combined into one process, system, or unit of operation.

By using a portal server, the alerts can be easily tracked and event resolution easily logged, as the users interface to the various systems used for resolution via the portal server and the portal server is aware of event resolution processes and is configured as needed to support the generation of workflow processes and templates from steps taken to resolve events.

Figure 3:
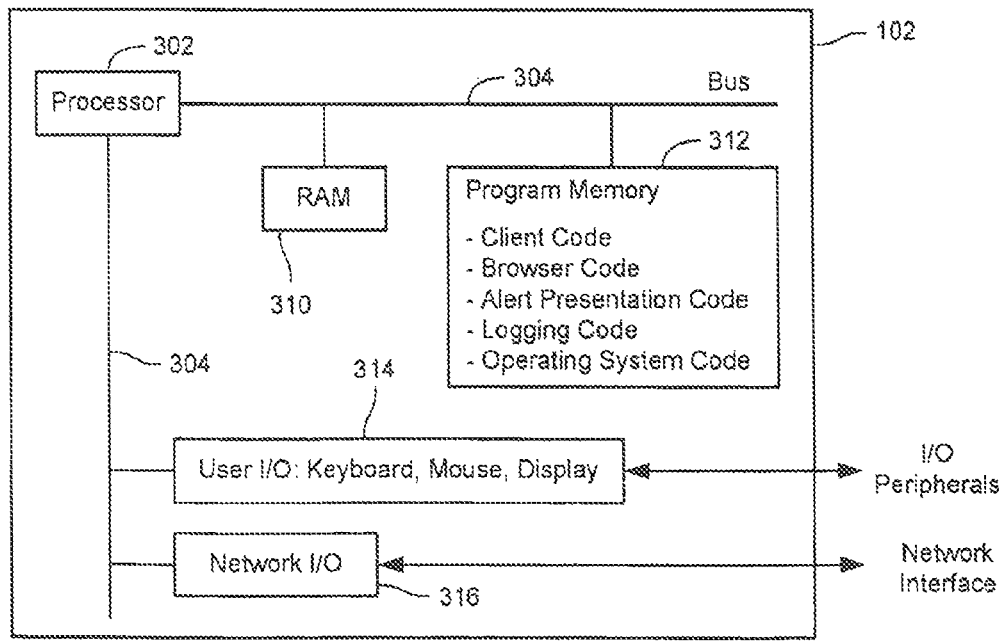
FIG. 3 is a schematic diagram illustrating various components of an example user computer system and interconnections therein as might be used by users interacting with the business management system of FIG. 1.

Although many suitable devices and programs can be used to implement one or more user computer systems, FIG. 3 shows one example. As shown there, user computer system 102 is implemented using a processor 302 coupled to components over a bus 304 and the components include RAM 310, program memory 312, user input/output 314 and network input/output 316. User input/output 314 can be used for interfacing to computer peripherals such as a keyboard, and mouse, a display, speakers, a microphone, etc. Network input/output 316 can be used for interfacing user computer system 102 to a portal server and/or other resources available over a network.

Program memory 312 can be implemented in various forms, such as ROM, hard disk, flash memory, virtual memory loaded over a network, or other persistent or semi-persistent forms of memory. Included in program memory 312 is program code implementing client services, program code implementing a browser, program code implementing alert presentation, program code for logging operations, operating system code, and possibly other program code. In some cases, additional code is provided and in some cases distinct code is not provided for some of the functions mentioned above. For example, separate code for implementing alert presentation and logging operations might not be provided if such functionality is provided by a portal server and the browser.

However it is done, program memory 312 contains program code or instructions, in object code form or source code form for handling various functions ascribed herein for user computer systems or clients. In some embodiments, some of the functionality is server-side, so all user computer system 102 needs for that approach is an interface to the server. For example, a portal server might be used, in which case user computer system 102 could operate with nothing more than an operating system and a browser (or other HTTP client) program.

Figure 4:
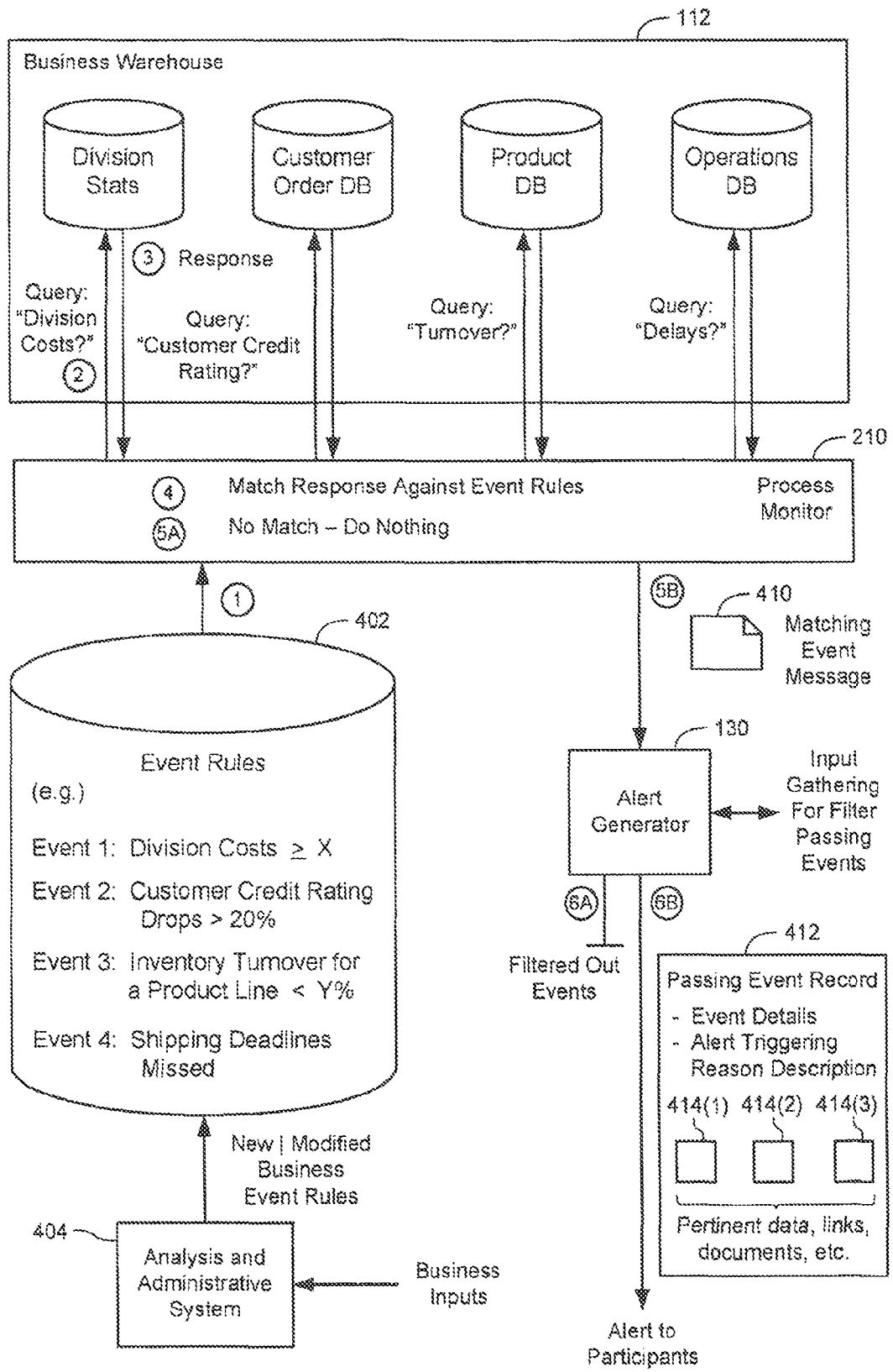
FIG. 4 is a schematic diagram illustrating event rule creation and alert generation based on event occurrences in a business data warehouse.

FIG. 4 is a schematic diagram illustrating event rule creation and alert generation based on event occurrences in a business data warehouse. As shown there, an event rules database 402 maintains definitions of events, as might be supplied by an analysis and administrative system 404, using business inputs. The definitions of events drive the alerts that are provided to participants and, for one example process, the steps are outlined with circled numbers. In a first step, event rule definitions are provided to process monitor 210, which then uses the rules to determine which queries to provide to various databases of business warehouse 112 (step 2). As each database returns an appropriate response (step 3) to the queries, process monitor 210 matches the responses against event rules (step 4) to determine when an event occurs. In general, each event record in event database 402 includes some rule or prespecified criteria that must be met for an event to occur.

For example, if division costs exceeding some number is considered an event (as defined by an event definition), process monitor 210 would query a division statistics database to identify actual division costs, receive the response and compare that to the number that is part of the event definition. If there is no match, process monitor 210 does nothing further with that query (step 5A), otherwise it provides a matching event message 410 to alert generator 130 (step 5B). Note that some events might occur because something did not occur as expected.

Alert generator 130 might then filter messages such that participants are not overwhelmed with alerts, thereby causing them to ignore alerts. Alert generator 130 can simply stop further processing on filtered out events (step 6A). For events that pass the alerts filters, alert generator 130 generates a passing event record 412. Alert generator 130 might gather additional information for filter passing events for inclusion in passing event records.

As shown, a passing event record 412 might include event details, an indication of the reason the alert was triggered, as well as pertinent data, documents, links, etc. 414. It should be understood that other methods of alert generation might be used.

Figure 5:
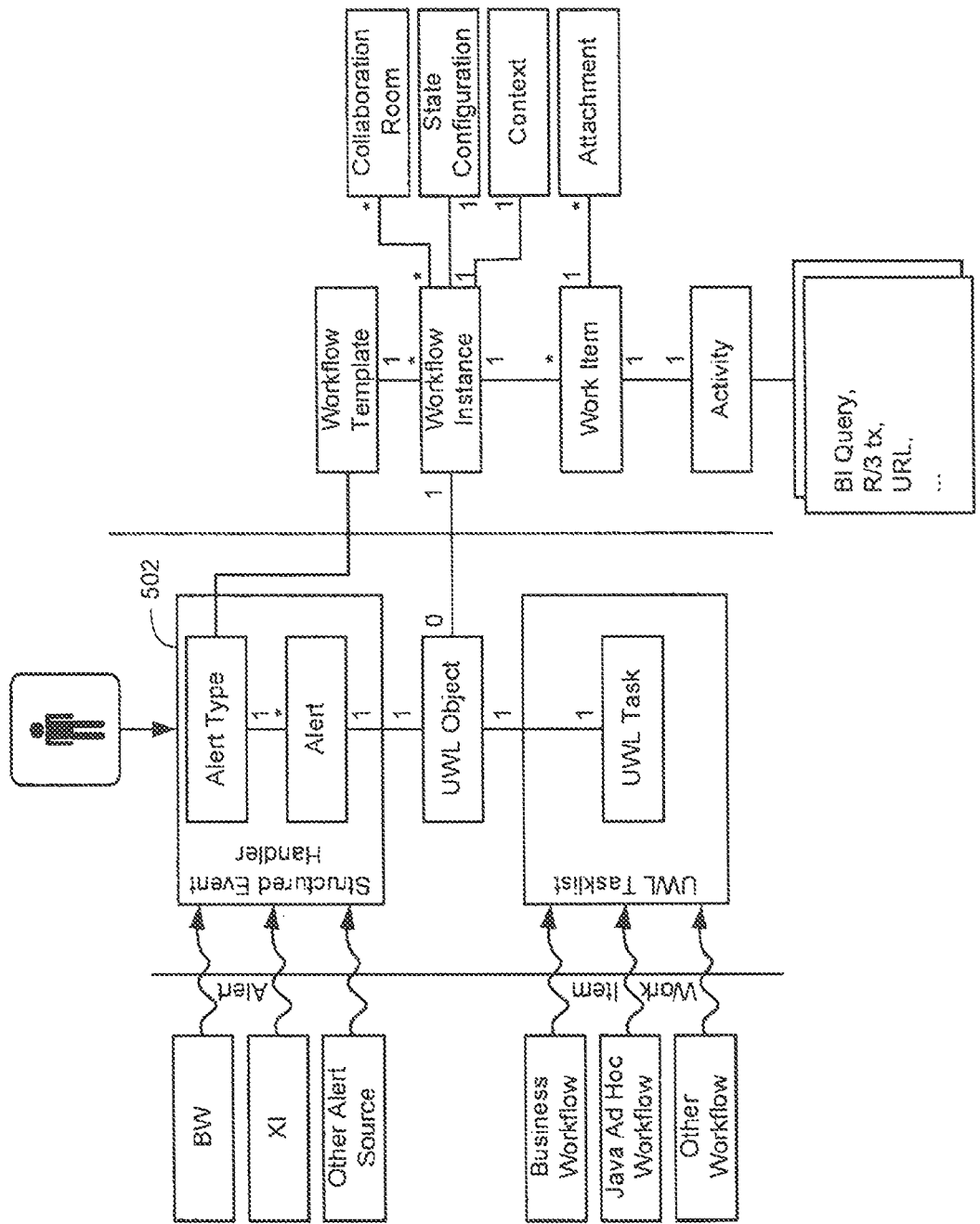
FIG. 5 is a block diagram illustrating interaction between a structured event handler and portions of a workflow system.

FIG. 5 is a block diagram illustrating interaction between a structured event handler and portions of a workflow system. As shown there, various systems provide alerts to a structured event handler 502. Structured event handler 502 can then store alerts by alert category, wherein each workflow template for alerts is associated with an alert category.

Data structures are indicated with "1" indicating a one-to-one relationship and "*" indicating a number (from zero to many)-to-one relationship.

Alerts can be mapped to a universal worklist object, which can be associated with a task in a workflow system. For example, when an alert is generated, it can be sent directly to structured event handler 502 as is or can be first enriched with some context information. The alert is then presented to relevant participants (e.g., end users of the system that might be called upon to act on the alert and resolve the underlying event). Once an alert is presented to a participant, that participant can turn on a system interaction recording process, resolve the underlying event, turn off the recording process and cause the recorded system interaction to persist as a stored template for a workflow process. When the interaction template is used, it is loaded and executed, which might involve creating workflow instances including work items and inviting other users in as resolution participants.

An alert might be represented by a data structure as illustrated in Table 1. The following alert properties illustrate one example of a possible internal structure of an alert:

TABLE 1

| Name | Meaning | Type |
|---|---|---|
| _ALERT_RECIPIENTS | Recipient list | alert recipient structure |
| _ALERT_ACTIVITIES | Subsequent activities | table of alert activities |
| _ALERT_EXPIRATION | Expiry date/time (time stamp) | timestamp |
| _ALERT_DYNAMIC_SHORTTEXT | Short text | salrtdcatd (CHAR60) |
| _ALERT_DYNAMIC_LONGTEXT | Long text | table of CHAR255 |
| _EVT_OBJECT | Triggering object | type BORIDENT |
| _ALERT_LOGICAL_SYSTEM | Logical system in which the alert is triggered | type RFCDEST |
| category identifier | Pointer to the alert category of which this alert instance is a member | type pointer to key |

Alert instances also have associated therewith an alert category and in a typical embodiment, each instance has an associated alert category representing the nature of the event that triggered the alert. For example, a user system might be preconfigured with vendor-provided alert categories and/or user-provided categories. Simple examples of alert categories are:

Number of sales dropped by 20%
Customer cancelled order with amount>$10,000
Customer requests are taking longer than 10 days to process Alert categories can be organized hierarchically. For example, one alert category might be "month-to-month sales dropped" and subcategories of that alert category might be "month-to-month sales dropped between 10% and 20%", "month-to-month sales dropped more than 20%", etc. In general, an alert category might be represented by a key, a descriptive name and an expression such that an instance of an alert of that category is generated when the expression evaluates to true. For a subcategory, the expression might be a subset of the expression for the parent category, but that need not be the case.

Figure 6:
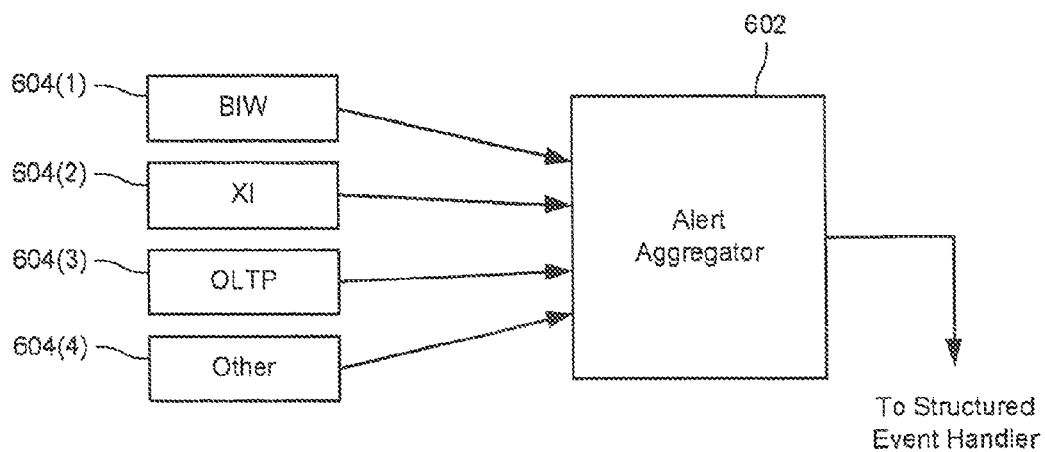
FIG. 6 is a block diagram illustrating alert aggregation.

An alert category might have the following properties:
Key (language-independent) for internal unique identification of the alert
Description (language-dependent)
Classification (e.g., where it is in a hierarchy of alert categories, or other classification)
Priority
Maximum number of deliveries (typically for a destination other than the alert inbox)
Expiry time (in minutes, etc.) after which the alert is deleted
Escalation recipient to whom the alert is sent if it is not confirmed by any of its initial recipients
Tolerance time before escalation
Short text
Long text
Title
Container for variable definition if variables are to be used in the text or for other application-specific attributes
Subsequent activities in the form of URLs
Other attributes FIG. 6 is a block diagram illustrating alert aggregation, wherein an alert aggregator 602 receives alerts from a plurality of sources 604 and may enrich the alerts with context information, providing the aggregated alerts to the structured event handler.

Figure 7:
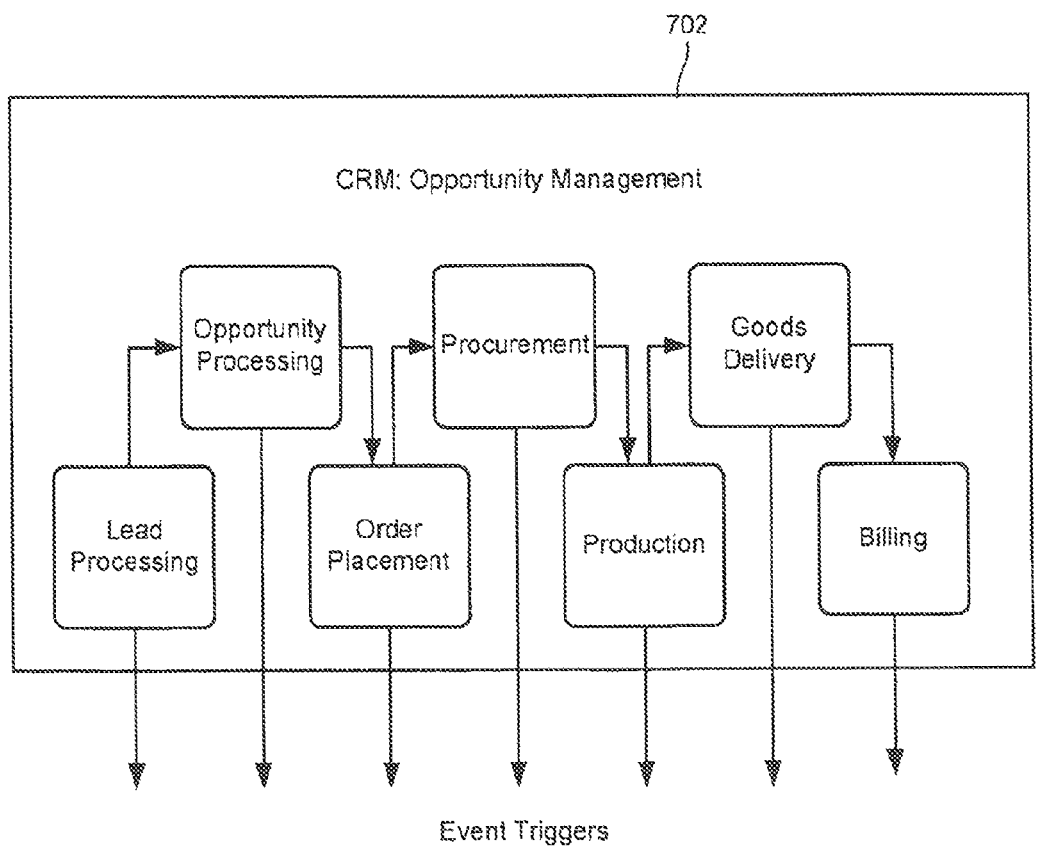
FIG. 7 is a schematic diagram illustrating multiple sources of event triggers from different components of a business system.

FIG. 7 is a schematic diagram illustrating multiple sources of event triggers from different components of a business system. For example, a customer relationship management (CRM) system 702 might comprise various modules, such as lead processing, opportunity processing, order placement, procurement, production, a goods delivery module, and a billing module. Each of these modules might generate event triggers. For example, the opportunity processing module might detect an unusual rise in risk of sales loss and create an event representing that rise. The structured event handler might in turn issue an alert to a department sales manager for resolution. Once alerted, the department sales manager could get more involved in an ongoing sale to reduce the risk of sales loss and/or help close the sale at risk.

Figure 8:
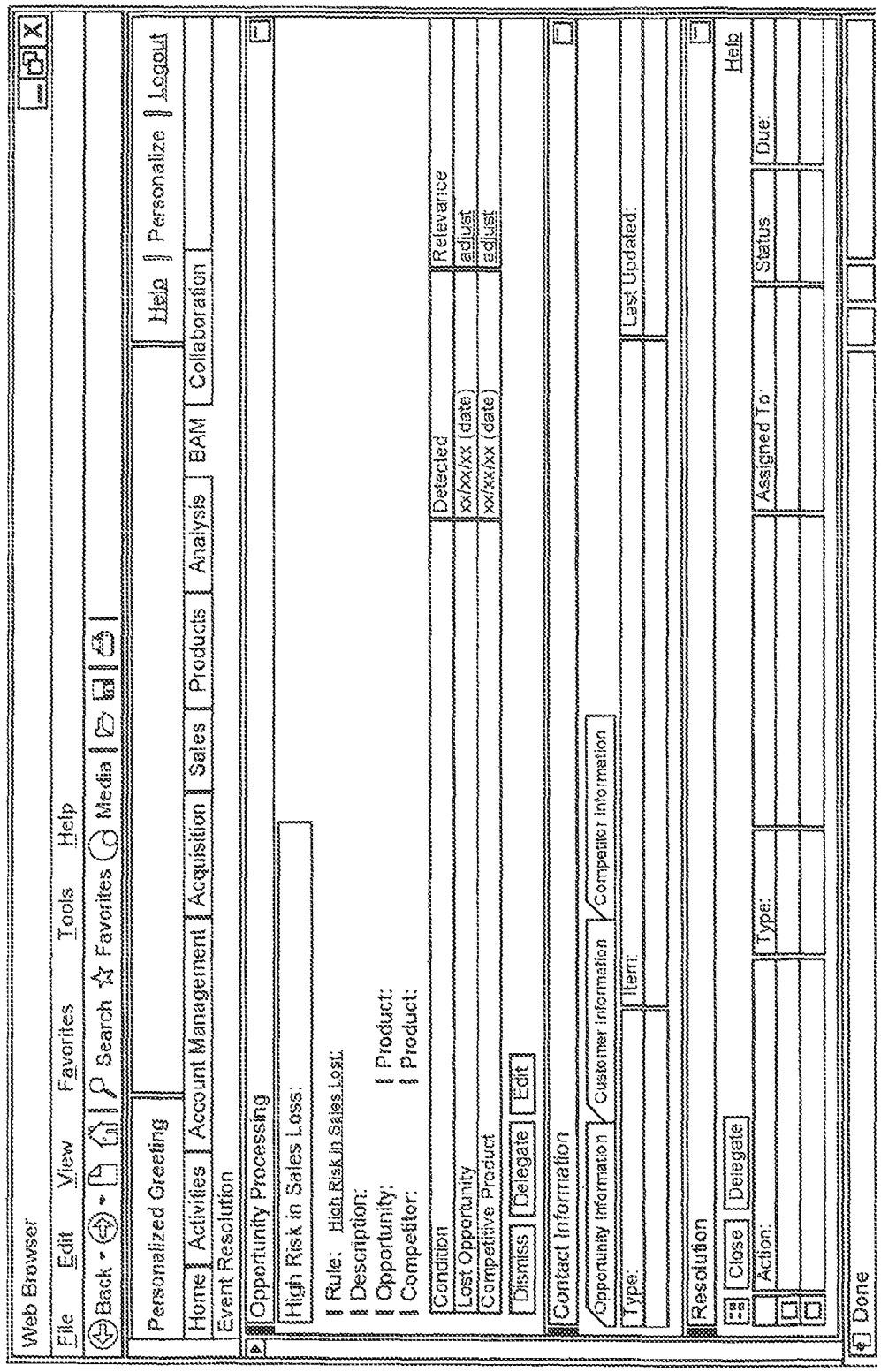
FIG. 8 is a screenshot of a user interface of an event resolution system.

FIG. 8 is a screenshot of a user interface of an event resolution system. In this example, an event resolution system provided an alert of an event and the user interface provides information about the event. Through the portal interface, the user can select an event resolution menu item from an event resolution system tab and see details of the event. As shown in this example, details about the rule and description of why the alert was triggered are presented, along with contextual information and suggested resolution steps. As described above, the selected resolution steps might be derived from templates of prior resolutions.

Today, knowledge workers increasingly have to deal with changes that affect their daily work significantly. Not only do companies change their product strategies, pricing, contracts, services, internal structure, etc. more frequently, the number of external influences is increasing. All of these changes lead to new situations where the individual user has to react flexibly within a short timeframe. In many cases, the user is made aware of the new situation by using business intelligence (BI) information. However, the action that has to follow is typically not covered in traditional business processes, because the situation is too new or the automation with a standard business application is too costly and time-consuming. Also, especially smaller companies do not have the bandwidth and resources to train or retrain a larger number of employees in response to a new situation. To assist with these situations, event resolution systems allow for systematic handling of recording, using and sharing action templates as a support for daily work. Generally speaking, an action template refers to a common or standardized set of tasks that an individual can apply to cope with a particular business problem or situation that was detected with the help of BI.

Event resolution facilitates the control of activities that previously might have been loosely linked, resulting in greater flexibility and optimization. It provides an alternative to unstructured collaboration, thus enabling the multiplication of expertise.

Figure 9:
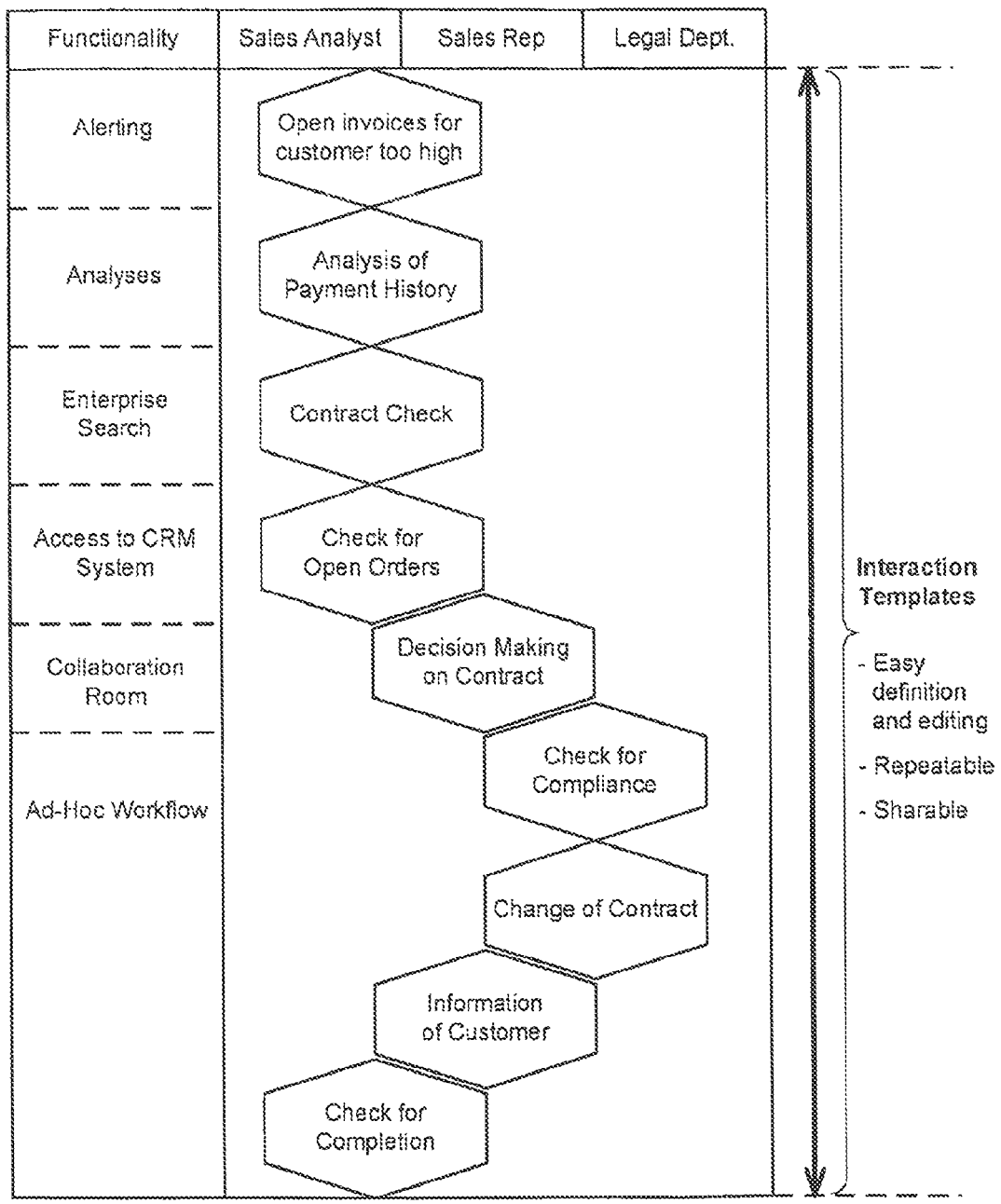
FIG. 9 is a diagram illustrating an example of a workflow process template derived from logging steps of an event resolution.

FIG. 9 is a diagram illustrating an example of a workflow process template derived from logging steps of an event resolution showing the steps in more detail. In this example, a sales analyst is signaled with an alert indicating that open invoices for a particular customer are too high. In response to the alert, the sales analyst analyzes payment history for that customer, does a search through an enterprise system for contracts with that customer, then might access a CRM system to check for open orders and involve the relevant sales rep. The sales rep can then participate in a process of decision-making on the contract and get another party, from the legal department, involved to check for compliance and possible changes to the contract. The legal department might then get the sales rep involved again to provide information from the customer or to the customer. As part of the workflow process, the process might conclude with the sales analyst checking for completion of the event resolution process.

Roles:

In this contract management scenario example, suppose "Jamie" is a sales analyst in a medium-sized enterprise. Her job is to provide up-to-date sales results to management. In addition, she is responsible for contract management, including the compliance with customer service level agreements (SLA's) and conditions of payment. In her company, the contract management process includes a number of steps, from initiating customer contact, creating an agreement, to releasing products, monitoring of incoming payments, triggering follow-up actions through to analyzing the results. Other individuals would have other roles or the same or similar roles. For example, an individual in the legal department might have the role of contract reviewer.

Alert: In the morning, Jamie typically checks a report that shows open invoices per customer, grouped in class A, B and C. Today, she is on half-day training so that she has not done this check so far. In a break, she checks her pager and discovers that she has received an alert from her BI system with the title "Open invoices for PayLate Corp above tolerance". The alert went to her pager because the alert routing rule was to look if she was online at her desk and if not, send the alert to her pager.

The alert is based on a threshold that Jamie has defined a week ago in the BI system that is based on an ABC classification of customers. Recently, the company has had some negative experiences with customers who deferred the payment of outstanding invoices as a result, so they implemented a new rule that generates an alert under such conditions for prompt handling. Assume this is the first time that the rule fired an alert, in which case a template might not yet exist for handling this situation.

Jamie decides to follow-up on this issue after the training has finished in order to deal with the situation before more products are shipped to the customer. Once she is back in her office, she logs on to an enterprise portal and finds the alert in her Universal Work List. As there is no template yet for this alert, there would be no "interaction template" icon attached to the alert. As she expects to run into similar situations in the near future, she turns on scripting (or might have an "always active" scripting option turned on).

Analysis:

From the Universal Work List, Jamie navigates to her business intelligence dashboard and it provides not only the query "invoices per customer", but also a graph on "sales per month" and a report on customer master data. She opens the query "invoices per customer" and filters per "PayLate Corp" and "open invoices" to see all open invoices for that customer. In addition, she does some slice and dice to get an Overview on the payment history for PayLate Corp.

Contract Check:

To double-check whether the outstanding payment is really out of tolerance, Jamie checks the existing customer contract. She navigates to an Enterprise Search portal snippet (such as an SAP Portals' iView program element) in her portal and types in the customer name. The customer contract is among the results that she gets, so she can read the contract to find that the customer is really out of tolerance.

Check for Open Orders:

As a next step, Jamie accesses a CRM system via a portal snippet to check for open orders. She quickly discovers that there is one open order where the shipment has been scheduled for the next day. As a result of the analysis that Jamie has done, there are two options: upgrade the customer to a class A customer with the corresponding payment conditions in the contract or hold back the scheduled shipment until the customer has paid at least parts of the outstanding invoices.

Collaboration:

As Jamie knows, the sales team always wants to be involved in any significant changes to contracts that affect "their customers". Therefore, she cannot decide on her own between the two options. From her BI dashboard, she initiates collaboration on the fly. To do so, he selects a menu item "collaborate . . . " and as an option the ability to create a collaboration room. The system runs her through a wizard to create a room. Jamie invites two sales reps to the room who work with the customer on a regular basis. The presence information displays that both of them are not available at the moment. Jamie shares both the report and the contract document in the collaboration room and schedules a virtual meeting with the two colleagues. Two hours later, the online collaboration takes place and the problem is discussed. Both colleagues agree that the customer should be upgraded to "class A" because the account has strategic importance for the company. Jamie agrees, but insists on involving the legal department to make sure that corporate guidelines for the contract are considered.

Solution:

An ad-hoc workflow with the sales team and the legal department is done. Jamie triggers an ad-hoc workflow to resolve the situation. She attaches the existing contract and the report to the workflow and addresses the legal department with the request to double check the customer upgrade. She assigns a deadline to the workflow. Jamie is a functional user so that the creation of the workflow is not done with the help of graphical design, but is wizard-based. The next receiver of the workflow is the sales representative who is supposed to inform the customer about the upgrade. He is also the one who updates the CRM system to reflect the new situation. Jamie tracks the status of the workflow in the course of the next days to make sure that all necessary steps are completed.

Recording:

The steps performed are stored as an interaction template. For example, using SAP NetWeaver, the system might have scripted the steps that Jamie took to respond to the new situation in a protocol. This protocol works like a "work task player" and includes the objects that were involved (both business and technical names of the document, query, navigational steps within the query (filters, drill-downs, slicing and dicing, etc.), involved people, transactions, etc., all in order. Jamie decides that she wants to keep a store of her problem resolution as an interaction template so that she and her colleagues can draw on it once the situation comes up again. To do so, Jamie selects the option "Save as Interaction Template" to store the template in a standard form without any further settings. Once the interaction template is created, it is instantiated by the system when the same alert occurs, so that Jamie or others can replay the steps.

Jamie has the option to "Edit Interaction Template" with the help of a short wizard that takes Jamie through the editing. In the wizard, additional comments can be added, scripted steps can be taken out or skipped, comments can be included, etc. Thus, the list of tasks can be streamlined, updated and saved as another version of the template. Comments provide additional context for other colleagues who want to use the template. Steps to be performed by co-workers are highlighted. With the wizard, Jamie also can change the trigger for this template as well as potential rules that are applied before the action template is proposed by the system. With these templates, planned cooperation between multiple persons can be modelled in a very flexible way. In the example, Jamie shares the template with a new colleague in her team who is supposed to support Jamie in the near future.

Templates

More generally, the logging of the steps might be done by scripting the interaction that formed the alert resolution, such as tracking all used documents, queries, chat room sessions, online meetings, and the like, including which users were involved (either by specific user identifier or by placeholders such as a "role" that is resolved at run-time to a specific user identifier) as well as user-specified steps not recognized or logged by the system during resolution.

Once the template has been created based on descriptive interaction steps, it can be replayed for future events and allow for ad hoc modifications, which result in the creation of derivative templates. The collection of templates associated with a particular alert category does increase as templates are created and derivative templates are created, and might decrease as users and/or administrators explicitly delete incorrect or infrequently used templates or some mechanism filters or sorts templates to eliminate some templates, such as rarely used templates in categories having many templates. Other considerations, such as particular users, particular presence of metadata, or the like might influence how templates are ranked, deleted, etc. Templates might be selected or invoked based on rules that are created, managed and/or executed by a workflow engine or a business application framework.

Templates should be managed such that all related aspects (permissions, search, versioning, editing, etc.) are handled consistently. A template repository might be used that also provides trigger management in deals with relationships or correlations between templates and alerts.

An example of a user interface for managing templates is provided in FIG. 10. Using this interface, the user can define an interaction template including interaction steps by browsing an action repository containing typical interaction fragments such as "approvals", "action items", "creation of a meeting requests", etc. or transactional processing steps such as creation of the planning sheet, approval of a purchase order, or update of an inventory sheet, and the like.

Templates allow individuals to act on significant business events and take the correct actions in the right business process context and provide that learning for later resolutions of similar events. In a typical business activity monitoring system, events are filtered according to alert rules and events matching alert rules trigger the generation of an alert. One alert would typically have an associated alert category and templates suggested for use in resolving the alert can be categorized using the same categories, thus allowing matching between templates and alerts.

Thus, an "event" is a meaningful change in the state of the enterprise, and an alert is a trigger for some resolution of the event that occurred. Event resolution enables individuals to act on significant events or groups of events and take the correct action in the right business process context. The resolution can be done within a portal-based dashboard that delivers alerting, additional contextual information (e.g., reports and documents) and links to resolution methods (e.g., collaboration rooms, ad-hoc workflow, etc.). With actionable reporting, individuals record, use, and share action templates as support for their daily work. An action template represents, in a very general sense, a common or standardized set of tasks that the individual can apply to cope with a particular business problem or situation that triggered the alert, facilitating the control of activities that previously have been loosely linked, resulting in greater flexibility and optimization potential. It provides an alternative to unstructured email-based or other collaboration, thus enabling the multiplication of expertise.

The first step to solve a problem is to know that there is a problem. That is why event resolution starts with alerting. To avoid "alerting overload", alerts can be suitably filtered so that only critical situations trigger alerts. The user might have the option to select from different delivery channels: a worklist such as SAP's Universal Worklist, as part of an SAP Portal, e-mail, SMS, pager, etc. One approach is to route the alert based on where the user is currently interacting with the system, such as whether the user is on-line. The complete rule explanation for what triggered the alert does not have to be included if the medium of interaction is limited.

Documents can explain the rule that triggered the alert. Especially in the case of corporate service level agreements or legal requirements, documents can provide additional background information on the trigger rule. Second, documents are generally relevant for many business situations. Price lists, quotas, product descriptions, customer master data sheets, internal guidelines, etc. can help the individual to cope with exceptions and find the right reaction to it. Relevant documents are not always delivered for a particular event resolution scenario. Therefore, an enterprise-wide keyword and content search for related documents and files can be added.

Direct access to transactions can also provide background information. In addition, OLTP reporting is still a widely-used form of information access to transactional systems.

New forms of context might be provided to support all types of end users with their event resolution. For example, rule explanations might be provided where rule statements are shown in business language with a description or more complex rules. A process visualization might also be provided, wherein a graphical display of the business processor parts of process is provided. Yet another form of context is predictive services that predict completion of one or more process instances, based on current data and history. Examples include time-series-analysis, trend lines, etc.

Added to these new forms of context for event resolution are interaction templates that provide a protocol or record of taken steps, involved people, documents, etc., that reflect event resolution history.

Preferably, it is transparent to the user why an alert has been triggered. This improves the willingness of the user to resolve the alert. The rule that triggered the alert should be displayed on demand in natural language, using business terminology (and not technical terms) wherever possible. For more complex rules, a short description as text and/or a document that is attached to the rule should be provided. The name of the rule author might also be mentioned as well.

One advantage of structured support for event resolution is the ability to learn from previous situations. Even if the situations are slightly different, it can be helpful to see what kind of action other colleagues took to deal with the event. The history or protocol of previous resolutions is also helpful to identify experts for certain situations. It is also helpful for new employee training.

With interaction templates, users can record, use, and share action templates on top of business intelligence as a support for daily work. Patterns in user behavior can be detected over time and relationships between e-mails, alerts, persons and subjects can be identified. Based on these patterns, the system can propose interaction templates for upcoming topics and alerts. If a template is used on a regular basis and the steps within the template prove to be relatively stable, it can be transformed into a guided procedure and made available throughout the organization.

Once the alert has been received and all available forms of context have been used, an action by the user should follow. The skills, biases, risk aversions and attentiveness of the individual play a part in whether and how to react. As this reaction is individual, there will be many cases where the actual resolution is not reflected or recorded in any system. In fact, many users will pick up the phone and call a colleague to deal with the event. Thus, sometimes it is not useful to structure every resolution and end users might oppose that. Nevertheless, it is good for the end user to have some system or facility available for structured resolution.

Event resolution can come in many forms, such as delegation, notification, transaction access, collaboration and/or guiding procedures. Delegation involves routing the alert to a more appropriate person to resolve the event. In many cases, a group of individuals has to work together to resolve an event. Thus, resolution teams can work together, share background information and experiences from similar situations, and engage in other forms of collaboration. Where ad hoc workflow is the appropriate resolution, a chain of actions, reflected in a workflow, might be triggered by the receiver of an alert.

In addition, it should also be possible to freeze the status of resolution for a particular event (snapshot) so that the user can resume action at a later point in time or forward the status to a colleague for further processing (e.g., for escalation management).

The user interaction with alerting and the underlying rules should be intuitive, to get buy-in as needed. Rules should be presented in natural language so that the target groups can understand the logic behind them. Operational users need not be familiar with underlying data structures, e.g., relevant attributes of events and processes.

A rule can be expressed as a directive, intended to influence or guide business behavior, in support of business policy that has been formulated in response to an opportunity, threat, strength or weakness. Technically, a rule can be defined as a statement that defines or constrains some aspects of the business. It is intended to assert business structure, or to influence the behavior of the business.

Rules might comprise:

1. Elementary expressions pointing to local data objects, e.g., constants, system variables (e.g., current time, location), etc.;

2. Logical expressions (conditions) that can include elementary expressions, comparison operators and Boolean operators (AND, OR, XOR) (e.g., expected sales volume>100.000 AND customer="Gold");

3. Result expressions: TRUE, FALSE, ERROR (e.g., if the result expression is TRUE, an alert is triggered); and/or 4. Rule attributes: Each rule has attributes, including the reference to the used (business) objects that are relevant for the rule.

Rules can also be combined into rules systems, so that a set of rules is structured according to a defined hierarchy. Thus, there can be simple rules, advanced rules and complex rules.

Simple business rules comprise a limited number of expressions, probably not more than two or three expressions. Rule attributes for simple rules, especially all usable objects, might be pre-defined for end user selection (e.g., event attributes that can be used for the rule.)

Advanced rules can have multiple, manageable building blocks. Advanced rules combine several building blocks, thus modeling a more complex business scenario with a higher number of expressions. There is probably also more time-dependency in advanced rules. Advanced rules might also make use of comparisons to historical or plan data that resides in a data warehouse. Advanced rules can be applied to multiple business events and across several business processes, leveraging the new level of transparency that event resolution can deliver.

Complex rules not only combine multiple building blocks, but can also include a set of rules that have some kind of relationship. This is built on the fact that a logical expression can also have a reference to another rule. Thus, rules systems are created. Rules systems can also be used to form decision trees: on each level of the decision tree, a rule decides which rule is evaluated next so that a complete hierarchy is reflected. While decision trees and the complex underlying rules systems are useful in automating workflows, for the automation of business processes, the reaction to each result expression might be modeled. One aspect of event resolution is on exceptions and the support of human resolution, so there is often no clear reaction to an event defined in advance. Complex rules can be relevant for event resolution if they reflect corporate rules, industry-specific metrics, SLA's or requirements for legal compliance.

In general, aspects of event resolution rely largely on simple and advanced rules. The rules are defined and applied by those who have the knowledge about the business processes and events: the operational employee and manager. In many, but not all cases, a parameterization (e.g., constants that are part of the rule have different values) of existing rules by the operational end users might be sufficient. Complex rules are relevant whenever important and complex policies are implemented in the organization.

A business event is a meaningful change in the state of the enterprise. These events can materialize as messages, protocols or alerts. Events can be generated by all kinds of systems, including OLTP systems, message brokers, data warehouses or business intelligence applications.

Once an event triggers an alert, the event is accepted, receives an ID and is correlated to a process instance. Mapping and storage of the process instance information is provided. The system might also "expect" events and generate alerts if the expected event does not occur (overdue management). This includes the ability to generate an alert as a result of a non-expected event (wrong type of event, wrong timing, etc).

Example of an event resolution:

1. Role: VP of operations services for a make-to-order business. A short manufacturing cycle necessitates that he keeps close tabs on every component for each product order. His company has three assembly plants where final products are assembled. Four other plants providing materials for assembly and two distribution centers support them. The plants are all located in different states.

2. Alert: The operations manager receives an alert that an important customer is in escalation mode. The event has been entered manually by the customer service team. The customer had called to inquire about the shipping status of a multimillion-dollar order. The customer service rep could not locate the order and asked for more time to get back with the answer.

3. Context and root-cause analysis: The operations manager opens the work in process (WIP) and a report on warehouse inventory to determine where the order was previously. He discovers that it is pending completion at one of the final assembly plants as it is waiting for a shipment of materials from one of the support plants. Upon further analysis, he determines that this shipment of materials was lost in transition between the plants. He estimates that it would be at least another 24 hours before he can get a replacement shipment to the assembly plant.

4. Immediate-Term resolution: He decides to cannibalize one shipment of materials from another order on the plant floor. The operations manager also places an expedited shipment order to replace that shipment. He instructs the production manager to finish the customer's order and get it ready before the end of the day. He asks the customer service team to inform the customer immediately that the order will be shipped the next day. He puts key staff members on high alert to ensure the customer receives the order.

5. Long-Term resolution might result in the operations manager determining that he is losing one tub of materials per day in transition, and this is causing significant variation in time to delivery. Knowing where all the components and subassemblies are is very critical to the business. Right from the raw-materials stage, he is concerned about where that material is that is going to end up in a finished product. He already has a warehouse system as well as a shop-floor tracking system. For better tracking of interplant activity and online, real-time updating of the ERP system, he decides to implement RF technology in his warehouses and on the shop floor. With current, real-time information, the customer service people can know instantly if a product has been loaded and shipped.

With the above, various embodiments of the present invention have been described. While the present invention has been described using a particular combination of elements, it should be recognized that other combinations of elements are also within the scope of the present disclosure. The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. In a computer system wherein messages are transferred between participants, at least some of which are human users of the computer system using the computer system in furtherance of work projects, and wherein a workflow system handles task-based operations in a structured environment, the computer system further comprising at least one monitored operations system that generates alerts to notify participants of events within the at least one monitored operations system, a computer implemented method of handling alerts in a structured manner comprising:

transmitting by the computer system, to a determined participant, a message comprising a first alert that a particular first event occurred, wherein the first event is determinable from at least one of the state of the computer system, the computer system's data or external data available to the computer system, wherein an alert rule indicates that the determined participant is to be alerted with the message when the particular first event occurs;

initiating a logging of event resolution responses by the determined participant in response to the first event to form an event resolution log;

storing, by the computer system, the event resolution log for use in informing a future determined participant, via the workflow system, as to a possible event resolution process when the future determined participant encounters a second alert of a second event wherein the second alert is similar to the first alert, the second event is similar to the first event or both, the possible event resolution process depending, at least in part, on the event resolution log for the first event;

ending the event resolution log when the determined participant signals to the computer system a resolution of the first event;

generating by the computer system a workflow process template from the event resolution log, the workflow process template comprising at least one workflow item; and storing by the computer system the workflow process template in the workflow system in association with a category identifier associated with the first event.

2. The method of claim 1, wherein the determined participant and the future determined participant are the same person and the event resolution log provides a reminder during handling of the second event as to how the first event was resolved.

3. The method of claim 1, further comprising:

providing the stored workflow process template to the future determined participant for use in informing the future determined participant as to a possible event resolution process when the future determined participant encounters the second alert; and accepting input from the future determined participant as to modifications to the stored workflow process template in response to actions performed by the future determined participant in resolving the second event, thereby generating one other dated stored workflow process template iteratively refined by a plurality of event resolutions.

4. The method of claim 1, wherein similarity of the second alert and the first alert is determined by a comparison of an alert category with which the second alert is associated and an alert category with which the first alert is associated.

5. The method of claim 1, wherein events comprise one or more of data or state matching prespecified event criteria and wherein alerts are generated for an event that match alert filters.

6. The method of claim 5, wherein the matching prespecified event criteria and alert filters are configured to support critical business operations or business activity that requires monitoring for successful outcomes of the business operations or business activity.

7. The method of claim 5, wherein events include events representing criteria met, transactions being created, conditions of business data being satisfied and events representing the lack of occurrence of an expected event.

8. The method of claim 7, wherein alerts include alerts according to alert rules that specify that particular participants are to be alerted when expected events do not occur when expected or as expected.

9. The method of claim 7, wherein alerts include alerts according to alert rules that specify that particular participants are to be alerted when data in a business activity monitoring system falls outside of a preferred pattern and the alerts contain indications of how the data falls outside of a preferred pattern to provide the particular participants with information about why the alert was generated and the event that needs resolution.

10. The method of claim 9, further comprising:
flagging when the determined participant involves at least one additional participant in an event resolution while the logging of event resolution responses by the determined participant is occurring;
initiating a logging of event resolution responses by the additional participant to form a multi-participant event resolution log;
generating a workflow process template from the multi-participant event resolution log, the workflow process template comprising at least one workflow item;
storing the workflow process template in the workflow system in association with an identifier associated with the first event including any indication of the plurality of participants involved with event resolution for the first event.

11. An apparatus comprising:
a computer system wherein messages are transferred between participants, at least some of which are human users of the computer system using the computer system in furtherance of work projects;
a workflow system that is configured to handle task-based operations in a structured environment;
at least one monitored operations system that is configured to generate alerts to notify participants of events within the at least one monitored operations system;
an alert generator that is configured to transmit, to a determined participant, a message comprising a first alert that a particular first event occurred, wherein the first event is determinable from at least one of the state of the computer system, the computer system's data or external data available to the computer system, wherein an alert rule indicates that the determined participant is to be alerted with the message when the particular first event occurs; and
a structured event handler that is configured to initiate a logging of event resolution responses by the determined participant in response to the first event to form an event resolution log, and that is configured to store the event resolution log for use in informing a future determined participant, via the workflow system, as to a possible event resolution process when the future determined participant encounters a second alert of a second event wherein the second alert is similar to the first alert, the second event is similar to the first event or both, the possible event resolution process depending, at least in part, on the event resolution log for the first event,
wherein the structured event handler is configured to end the event resolution log when the determined participant signals to the computer system a resolution of the first event,
wherein the structured event handler is configured to generate a workflow process template from the event resolution log, the workflow process template comprising at least one workflow item, and
wherein the workflow system is configured to store the workflow process template in association with a category identifier associated with the first event.

12. The apparatus of claim 11, wherein:
the workflow system is configured to provide the stored workflow process template to the future determined participant for use in informing the future determined participant as to a possible event resolution process when the future determined participant encounters the second alert; and
the workflow system is configured to accept input from the future determined participant as to modifications to the stored workflow process template in response to actions performed by the future determined participant in resolving the second event, thereby generating one other dated stored workflow process template iteratively refined by a plurality of event resolutions.

13. The apparatus of claim 11, further comprising:
a process monitor that is configured to store a plurality of alert rules including the alert rule, that is configured to query the at least one monitored operations system using the plurality of alert rules, and that is configured to match a response from the query to determine that the particular first event occurred.

14. The apparatus of claim 11, further comprising:
a portal server that is configured to interface, via a network, between the participants and the at least one monitored operations system, and that is configured to support the generation of the possible event resolution process.

15. The apparatus of claim 11, wherein the at least one monitored operations system includes an online transaction processor that is configured to determine the particular first event according to transaction data.

16. The apparatus of claim 11, wherein the at least one monitored operations system includes a business information warehouse server that is configured to determine the particular first event according to business information warehouse data.

17. The method of claim 1, further comprising:
turning on scripting to initiate the logging of the event resolution responses.

18. The method of claim 1, further comprising:
editing the workflow process template that was generated by the computer system.

19. The method of claim 1, further comprising:
recording, by the computer system, objects and transactions that were involved when recording steps that a user took to respond to the message.

20. A computer readable medium for controlling a computer system wherein messages are transferred between participants, at least some of which are human users of the computer system using the computer system in furtherance of work projects, and wherein a workflow system handles task-based operations in a structured environment, the computer system further comprising at least one monitored operations system that generates alerts to notify participants of events within the at least one monitored operations system, the computer readable medium upon which are tangibly embodied computer program instructions that when executed by the computer system cause the computer system to perform a method comprising:

transmitting by the computer system, to a determined participant, a message comprising a first alert that a particular first event occurred, wherein the first event is determinable from at least one of the state of the computer system, the computer system's data or external data available to the computer system, wherein an alert rule indicates that the determined participant is to be alerted with the message when the particular first event occurs;

initiating a logging of event resolution responses by the determined participant in response to the first event to form an event resolution log;

storing, by the computer system, the event resolution log for use in informing a future determined participant, via the workflow system, as to a possible event resolution process when the future determined participant encounters a second alert of a second event wherein the second alert is similar to the first alert, the second event is similar to the first event or both, the possible event resolution process depending, at least in part, on the event resolution log for the first event;

ending the event resolution log when the determined participant signals to the computer system a resolution of the first event;

generating by the computer system a workflow process template from the event resolution log, the workflow process template comprising at least one workflow item; and storing by the computer system the workflow process template in the workflow system in association with a category identifier associated with the first event.

* * * * *